R. L. WILHELM.
SPEED GEARING.
APPLICATION FILED AUG. 5, 1910.

988,235.

Patented Mar. 28, 1911.

Witnesses
Chas. C. Richardson.
James A. Ewell

Inventor
Ralph L. Wilhelm,
By Victor J. Evans
Attorney

UNITED STATES PATENT OFFICE.

RALPH L. WILHELM, OF REDFIELD, SOUTH DAKOTA.

SPEED-GEARING.

988,235. Specification of Letters Patent. Patented Mar. 28, 1911.

Application filed August 5, 1910. Serial No. 575,706.

*To all whom it may concern:*

Be it known that I, RALPH L. WILHELM, a citizen of the United States of America, residing at Redfield, in the county of Spink and State of South Dakota, have invented new and useful Improvements in Speed-Gearing, of which the following is a specification.

This invention relates to speed gearing and particularly to the type of gearing employing a multiple gear on a driven shaft and a gear on a drive shaft, the object of the invention being to provide a novel drive shaft and improved mechanism actuating the shaft to move the gear away from the multiple gear and for moving the gear on the drive shaft across the surface of the multiple gear.

Figure 1:
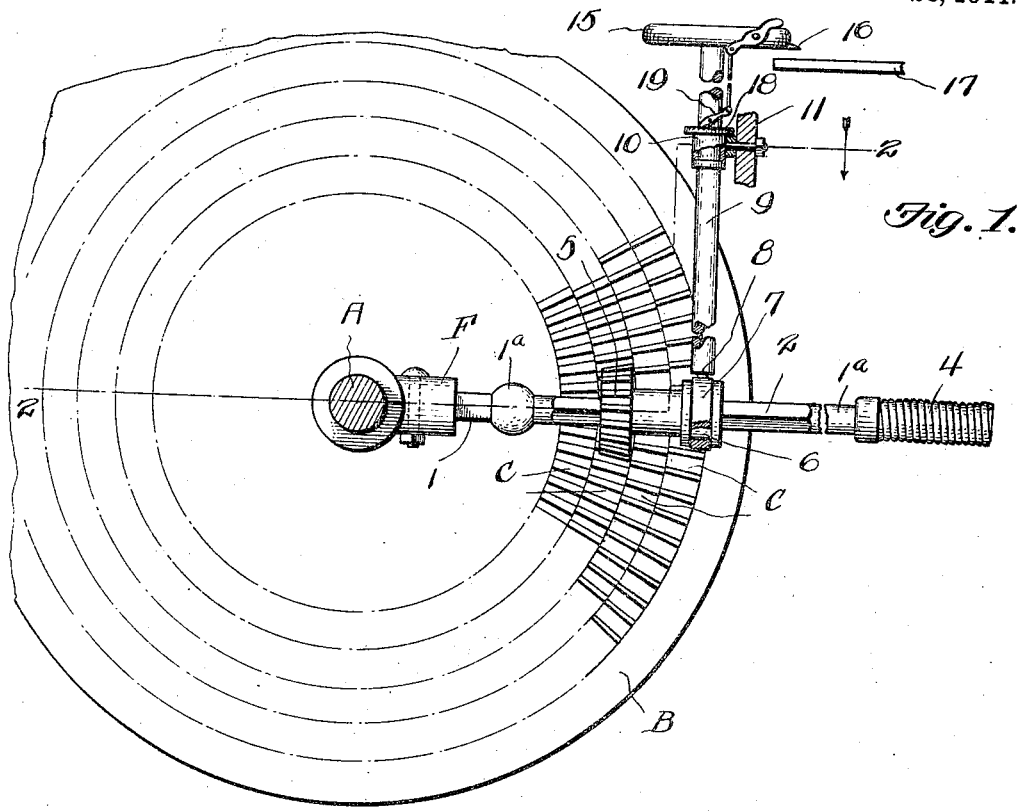
Figure 2:
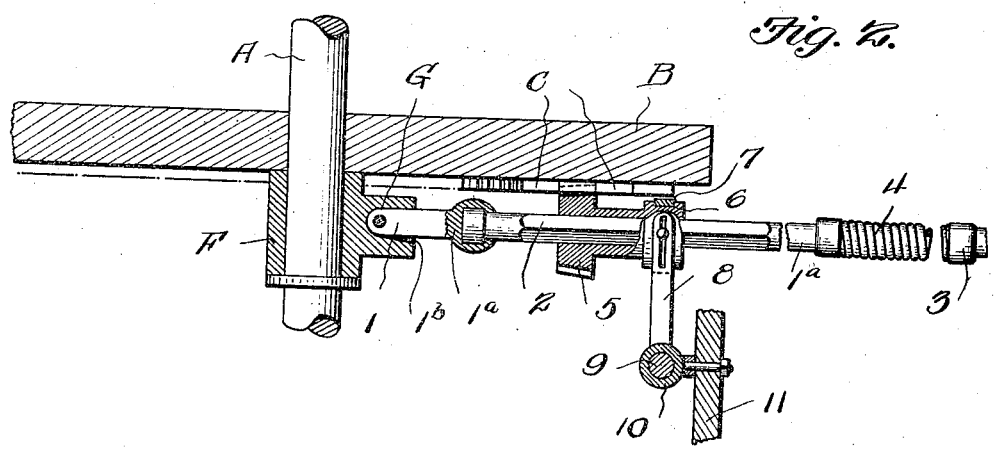

In the drawing, forming a portion of this specification and in which like numerals of reference indicate similar parts in the several views: Figure 1 is a sectional elevation of my improved gearing. Fig. 2 is a section taken on the line 2—2 of Fig. 1.

In the drawing, A represents the driven shaft and B the multiple gear thereon. This gear is of ordinary construction and it is provided in the present instance with three sets of concentric teeth C. The shaft A is provided with a pivotally mounted bearing member F which has formed therein a socket G for the pivoted stem 1 of the bearing 1ª. The drive shaft is provided with the sections 2 and 3 and with an intermediate flexible section 4. The section 2 has one end revolubly mounted in the bearing 1ª. A bevel gear wheel 5 is slidably mounted on the portion 2 of the drive shaft, and as shown, this gear wheel is formed to provide an annular groove 6 in which is mounted a loose band 7. This band is pivotally and slidably connected with the crank arm 8 of the actuating member 9. The actuating member 9 is mounted in the pivoted bearing 10 on the bracket 11. The actuating member 9 is provided at its upper end with a controlling wheel 15 on which an indicator 16 is formed to coöperate with a fixed indicator 17 which is graduated so as to designate the position of the gear wheel 5 on the multiple gear wheel B.

The construction of the gearing described and shown herein is such that the actuating member 9 can be conveniently rocked manually to move the drive shaft laterally of the multiple gear B. After the drive shaft has been moved away from the multiple gear as just described, the actuating member may be revolved to cause the crank portion 8 thereof to impart sliding movement to the gear wheel 5 to cause it to mesh with the desired series of teeth on the gear wheel B. The uppermost bearing 10 of the bracket 11 is formed to provide a small ratchet surface 18 with which a locking pawl 19 on the actuating member 9 can be engaged so as to hold the actuating member in the desired adjusted position of its rotary movement. The outward swinging movement of the drive shaft is limited through the provision of the shoulder 1ᵇ in the socket G. This shoulder is designed to engage the stem 1 of the bearing 1ª.

I claim:—

1. In speed gearing, a multiple gear, a drive shaft movable toward and away from the said multiple gear, a gear wheel on the drive shaft, a rock member, and controlling mechanism revolubly mounted on the rock member and operatively connected with the drive shaft and with the said gear wheel thereon to move the shaft and the movable gear together and to move the gear wheel longitudinally on the drive shaft and across the gear wheel-engaging surface of the multiple gear.

2. In speed gearing, a driven shaft, a multiple gear thereon, a bearing movably mounted on the driven shaft, a flexible drive shaft mounted for rocking movement on the bearing, a gear wheel slidable on the drive shaft, and controlling mechanism operatively connected with the drive shaft and with the gear wheel thereon to move the drive shaft toward or away from the multiple gear and operable also to move the gear wheel on the drive shaft across the surface of the multiple gear.

3. In speed gearing, a multiple gear, a drive shaft, the said drive shaft and the multiple gear respectively being constructed for relative movement, a gear wheel slidably mounted on the drive shaft, an actuating member, a bearing revolubly and pivotally supporting the actuating member, a crank arm operatively connected with the gear wheel of the drive shaft and operating on rocking movement of the actuating member to move the gear wheel out of engagement with the multiple gear and operable on rotation of the actuating member to slide the gear wheel of the drive shaft across the surface of the multiple gear.

4. In speed gearing, a multiple gear, a drive shaft, the said drive shaft and the multiple gear respectively being constructed for relative movement, a gear wheel slidably mounted on the drive shaft, an actuating member, a bearing revolubly and pivotally supporting the actuating member, a crank arm operatively connected with the gear wheel of the drive shaft and operating on rocking movement of the actuating member to move the gear wheel out of engagement with the multiple gear and operable on rotation of the actuating member to slide the gear wheel of the drive shaft across the toothed surface of the multiple gear, and means on the actuating member for engaging the bearing to hold the actuating member against rotation.

In testimony whereof I affix my signature in presence of two witnesses.

RALPH L. WILHELM.

Witnesses:
GEORGE W. FISCHER,
RAYMOND C. ALMQUIST.